United States Patent Office 2,803,520
Patented Aug. 20, 1957

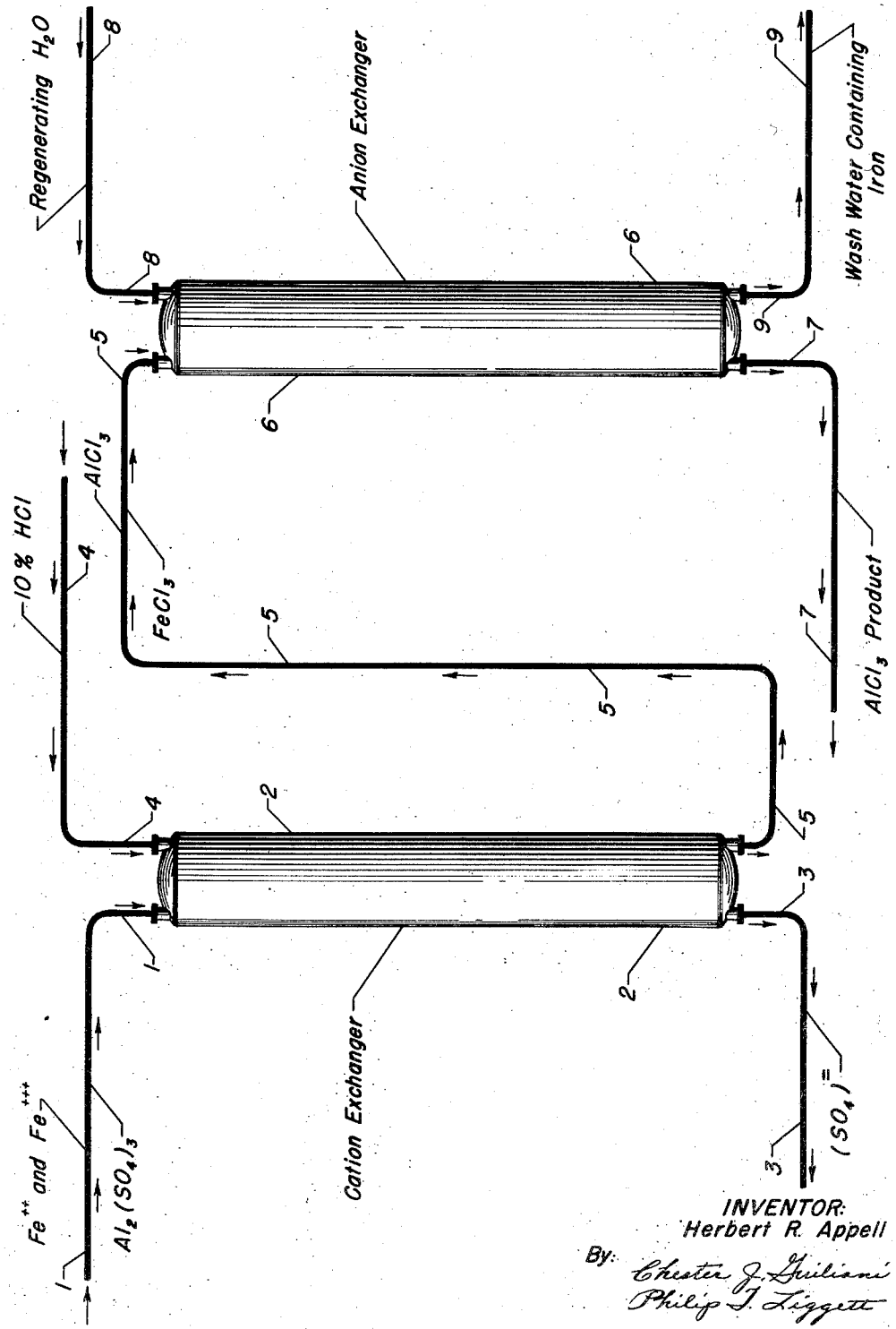

2,803,520

PREPARATION OF ALUMINUM HALIDE FROM OTHER ALUMINUM SALTS

Herbert R. Appell, North Riverside, Ill., assignor to Universal Oil Products Company, Des Plaines, Ill., a corporation of Delaware Application September 22, 1953, Serial No. 381,703

4 Claims. (Cl. 23—92)

This invention relates to the production of aluminum halides and more specifically to a process for preparing a purified aluminum halide from a salt of aluminum containing an impurity.

In many industrial applications it is desirable to remove impurities from aluminum salts and this is especially true in the catalytic field since these aluminum salts, especially aluminum halides, are used as catalysts or are used as compounds which are converted into catalytic materials. When these materials are directly used as catalysts or compounds which are converted into catalytic substances, the presence of impurities even in exceedingly low quantities may be harmful. In a recently developed alumina-platinum-halogen catalyst that is used in the reforming of gasoline the percentage of platinum may be from about 0.01% to about 1% by weight of the final catalyst. Due to these exceedingly low percentages of precious metals, it is important that the precious metal and the alumina be free from or contain only very small percentages of impurities, since the presence of these impurities is often objectionable and may mask or counteract the effect of the precious metal in the desired catalytic reaction. One method of preparing the alumina for this catalyst is by precipitating aluminum hydroxide from aluminum chloride by the addition of ammonium hydroxide, and it is thus necessary that the aluminum chloride that is used be substantially pure, and the process of this invention may be used to prepare the pure aluminum chloride.

Heretofore chemical as well as electrolytic processes have been suggested to purify these metals or metal compounds. The disadvantage of these types of processes is that they are slow and it is likewise very difficult to remove all of the impurities. Since the aluminum halide is often desired in such a highly purified form, especially in catalyst manufacture, the electrolytic process is not particularly adaptable to the purification.

It is an object of my invention to prepare purified aluminum halides more quickly and more economically than has been possible heretofore.

In one embodiment the present invention relates to a method of preparing aluminum halide from a salt of aluminum which comprises contacting a solution of said aluminum salt and impurity with a strongly acid cation exchanger, and washing said cation exchanger with an aqueous solution of a hydrogen halide.

Another embodiment of the present invention relates to a method of preparing a purified aluminum halide from a salt of aluminum containing an anion impurity which comprises passing a solution of said aluminum salt and impurity into contact with a strongly acid cation exchanger, and washing said cation exchanger with an aqueous solution of a hydrogen halide.

In a specific embodiment the present invention relates to a method of preparing purified aluminum chloride from aluminum sulfate containing an anion impurity which comprises passing a solution of said aluminum sulfate and impurity into contact with a strongly acid cation exchanger, stopping this contacting, and washing said cation exchanger with an aqueous solution of hydrogen chloride.

Aluminum salts often contain impurities such as copper, nickel, iron, manganese, chromium, molybdenum, arsenic, magnesium, sodium, potassium, etc. While the presence of these impurities is not ordinarily objectionable in most of the commercial uses of the aluminum salts, their presence may be objectionable in other uses, especially in catalyst manufacture.

According to the process of my invention the aluminum salt is dissolved in water and the soluble impurities also go into solution. The solution of the aluminum salt and impurity is contacted with a solid cation exchange resin which picks up the aluminum ions and cation impurities. Shortly after the cation exchanger is saturated with aluminum, that is when aluminum begins to appear in appreciable quantities from the cation exchanger, the contacting is stopped. The first effluent contains cations less strongly held than aluminum. If a product free of monovalent and divalent ions is desired the cut should not be taken too soon after the first aluminum appears in the effluent. A loosely held cation such as sodium can be readily removed in this manner. The cation exchanger is then washed with an aqueous solution of a hydrogen halide whereby the ion exchange resin is regenerated and the aluminum is washed off of the resin as aluminum halide and the cation impurities are also freed from the ion exchange resin.

By this step of the invention the anion impurities such as chromates, molybdates, arsenates, etc. are removed since they freely pass through the cation exchange resin. Also this step an aluminum salt such as aluminum sulfate is converted to an aluminum halide. This is particularly advantageous since pure aluminum halide is more desirable as a catalyst or as a material to be used in preparing a catalyst than aluminum sulfate. The solution of aluminum halide containing cation impurities may, according to this process, be purified in two ways. In one the solution is contacted with an anion exchange resin in the thiocyanate form, and in the other the solution is commingled with a thiocyanate and the mixture is passed into contact with an anion exchange resin that is convertible to the thiocyanate form. This step of the process will remove impurities that are convertible to thiocyanate complexes. The thiocyanate complex of iron is very stable and, accordingly, this step of the process will especially remove iron impurities. The iron enters into a complex with the thiocyanate ion when the thiocyanate is present on the resin originally or when the thiocyanate is added to the impurity containing solution. In the former case the effluent leaving the anion exchange resin in the thiocyanate form will be low in iron impurities, and in the latter case the solution leaving the anion exchange resin will similarly be low in iron impurities since the anion exchange resin will pick up the iron thiocyanate complex ion. The thiocyanate must not already be present as a complex of the impurity that it is desired to remove, and, therefore, since iron is the most undesirable impurity, the thiocyanate must be iron free and the thiocyanate is a non-ferrous thiocyanate.

The anion exchange resin must not be used longer than the point where an appreciable amount of iron is indicated in the effluent and similarly for economic reasons the cation exchange resin should only be used while it is picking up substantially all of the aluminum from the first contacting solution. There is a definite amount of ion that an ion exchange resin may react with, and when this point is reached, the resin will no longer exchange, and it will be necessary to regenerate or replace the ion exchange resin.

Almost any solid cation exchange material that can be converted to an acid form and that may be readily regenerated by a hydrogen halide may be used in the process of my invention, however, strongly acidic organic exchangers are preferred because they can be used in strongly acidic solutions with little loss of efficiency. Examples of organic cation exchangers that may be used in my process are the sulfonated coal or carbonaceous zeolites and synthetic resins of the phenolic or non-phenolic type. A specific example of a cation exchange resin of the non-phenolic type is a sulfonated copolymer of styrene and divinylbenzene. These exchange materials may be present in various physical forms such as powders or chips and a particularly suitable form is the spheroidal form. These ion exchange materials have different relative capacities for absorbing the different cations from the aqueous solutions, and by experimentation it is possible to determine the most effective ion exchange material to be used. Since the aluminum salts are often acidic, it is desirable that the cation exchange material be stable with reference to the acidity, and for this reason the sulfonated resins are particularly suitable.

Generally speaking, the cation exchange materials that are preferred can be regenerated by treatment with an acid solution and in the resulting hydrogen condition they will remove aluminum cations from the solution. The cation exchange materials have satisfactory physical stability especially in reference to temperature so that they may be used at temperatures from the freezing point of the solution to be purified, up to the boiling point of the solution to be purified, however, each ion exchange material is specific in reference to the maximum temperature at which it is stable. As an example, the maximum temperature at which a monofunctional sulfonated copolymer of styrene and divinylbenzene will operate satisfactorily is approximately 300° F.

Almost any solid anion exchanger that can be converted to a thiocyanate form may be used in my process. Tetraethylene-pentamine-epichlorohydrin resins, glycerol dichlorohydrin and polyepoxy condensation products with polyalkylene polyamines which are treated with quaternizing agents such as methyl sulfate may be used. Commercial Amberlite IR-400 and Amberlite XE-75 have given satisfactory results. The ferro-thiocyanate complex of the anion exchange material may be washed out with water. The water having a pH of 7 decomposes the ferro-thiocyanate complex and washes out the iron.

The hydrogen halide that is used in the present invention usually is hydrogen fluoride or hydrogen chloride, however, a mixture of the two may also be used. When using hydrogen chloride as the hydrogen halide, the aluminum is recovered as aluminum chloride, and similarly when hydrogen fluoride is used, aluminum is recovered as aluminum fluoride. The hydrogen halide is preferably used in aqueous solution. Generally concentrations of from about 3% to about 30% are preferred. The solution of the hydrogen halide may be used either hot or cold with the temperatures within the range of from about 32° F. to about 212° F.

The drawing illustrates a specific adaptation of the invention. Referring to the drawing an aluminum sulfate solution containing iron cations as impurities is passed through line 1 into cation exchanger 2 in which is placed a cation exchange resin which is a mono-functional sulfonated copolymer of styrene and divinylbenzene known commercially as IR-120 Amberlite. The solution is passed through the exchanger until aluminum appears in the effluent from the exchanger which is withdrawn through line 3. The contacting is stopped and a 10% solution of hydrochloric acid is passed through line 4 into exchanger 2. The hydrochloric acid regenerates the cation exchange material and aluminum chloride and iron chloride are withdrawn through line 5 and passed into anion exchanger 6. Anion exchanger 6 is filled with an anion exchange resin in the thiocyanate form. The effluent from this contacting is withdrawn through line 7 and the effluent is analyzed as being substantially pure aluminum chloride. The anion exchange resin may be regenerated by adding water through line 8 and removing the iron impurities through line 9 by a mechanism as hereinbefore described. For simplification equipment such as pumps, valves, heater changers, etc. have been omitted from the diagram since their presence does not aid in the understanding of the invention.

The following example is given to illustrate the novelty and utility of the process of my invention but not with the intention of unduly limiting the generally broad scope of the invention.

*Example*

One liter of an aluminum sulfate solution which contains 3.69 pounds of aluminum sulfate per gallon of solution was passed through a bed of commercial IR-120 Amberlite cation exchange resin in the acid form, which resin is a type of mono-functional sulfonated copolymer of styrene and divinylbenzene. The bed was 5 cm. in diameter and 97 cm. high. The bed was originally saturated with water and the aluminum sulfate solution was passed through at a liquid hourly space velocity of 0.5. When the water was displaced from the bed, a solution of sulfuric acid was obtained. This solution contained 11.4% sulfuric acid and was free of aluminum. The solution and cation exchange resin were maintained at room temperature. After the liter of solution had passed through the column, the bed was then washed upflow with approximately 4 liters of water in order to remove sulfate from the column. A solution of 21% hydrochloric acid was then used to regenerate the resin. A solution of aluminum chloride in excess hydrochloric acid appeared in the effluent and a total of 1808 ml. was obtained. Approximately 860 ml. of this effluent was passed through a column which contained Amberlite XE-75 which is an anion exchange material in the thiocyanate form. This column was 1.5 cm. in diameter and 38 cm. high. A liquid hourly space velocity of about 0.5 was again used with the temperature of the resin and the solution being approximately room temperature. The effluent from this contacting was an aqueous solution of substantially pure aluminum chloride.

I claim as my invention:

1. A method of preparing aluminum halide from a salt of aluminum other than a halide which comprises passing a solution of said aluminum salt into contact with a strongly acid cation exchanger, and thereafter washing said cation exchanger with an aqueous solution of at least one hydrogen halide selected from the group consisting of hydrogen chloride and hydrogen fluoride.

2. A method of preparing aluminum chloride from aluminum sulfate which comprises passing a solution of said aluminum sulfate into contact with a strongly acid cation exchanger, stopping this contacting upon saturation of the exchanger with aluminum, and washing said cation exchanger with an aqueous solution of hydrogen chloride.

3. A method of preparing aluminum halide from an aluminum salt other than a halide and containing an anion impurity, which comprises contacting a solution of said salt and impurity with a strongly acid cation exchanger to absorb aluminum ions in the exchanger, continuing the contacting until the exchanger is saturated with aluminum, and thereafter washing the exchanger with an aqueous solution of at least one hydrogen halide selected from the group consisting of hydrogen chloride and hydrogen fluoride to remove the absorbed aluminum as an aluminum halide solution.

4. A method of preparing aluminum halide from aluminum sulfate containing an anion impurity, which comprises contacting a solution of said sulfate and impurity with a strongly acid cation exchanger to absorb aluminum ions in the exchanger, continuing the contacting until the exchanger is saturated with aluminum, and thereafter washing the exchanger with an aqueous solution of at least one hydrogen halide selected from the group consisting of hydrogen chloride and hydrogen fluoride to remove the absorbed aluminum as an aluminum halide solution.

References Cited in the file of this patent

UNITED STATES PATENTS

| | | |
|---|---|---|
| 1,392,044 | Booth et al. | Sept. 27, 1921 |
| 1,857,844 | Haglund | May 10, 1932 |

OTHER REFERENCES

J. W. Mellor's: "A Comprehensive Treatise on Inorganic and Theoretical Chem." vol. 5, 1924 ed., pp. 312–315, 335, Longmans, Green and Co., N. Y.

"Analytical Chem.." vol. 23, No. 6, June 1951, pages 930, 931.